United States Patent [19]

Yamauchi et al.

[11] Patent Number: 4,795,800
[45] Date of Patent: Jan. 3, 1989

[54] SCALE DEPOSITION PREVENTING AGENT

[75] Inventors: Hiroaki Yamauchi, Kakogawa; Toragoro Mitani; Takamichi Komabashiri, both of Takasago, all of Japan

[73] Assignee: Kanegafuchi Kagaku Kogyo Kabushiki Kaisha, Osaka, Japan

[21] Appl. No.: 52,392

[22] Filed: May 21, 1987

[30] Foreign Application Priority Data

May 21, 1986 [JP] Japan .................. 61-116881

[51] Int. Cl.$^4$ .............................................. C08G 12/00
[52] U.S. Cl. ...................................... 528/229; 526/62; 526/74
[58] Field of Search ............... 528/229; 526/62, 74

[56] References Cited

U.S. PATENT DOCUMENTS 4,024,330 5/1977 Morningstar et al. .
4,081,248 3/1978 Cohen .
4,517,344 5/1985 Mitani et al. .

FOREIGN PATENT DOCUMENTS 0008887 8/1979 European Pat. Off. .
1578805 7/1976 United Kingdom .

OTHER PUBLICATIONS

Chemical Abstracts vol. 89, 1978 p. 18, abstract No. 6819h, Columbus Ohio, U.S.; and JP-A-78 13 689 (Shin-Etsu Chemical Industry CO. Ltd.) 07-02-1978.

Primary Examiner—Morton Foelak
Attorney, Agent, or Firm—Antonelli, Terry & Wands

[57] ABSTRACT

A process for preparing a scale deposition preventing agent of a quinone-amine compound suitable for use in a polymerization of acrylic or methacrylic acid ester monomers, which comprises (A) subjecting an aromatic quinone and an aromatic diamine to addition reaction in a solvent having a solubility parameter of 8.5 to 24.0 to give an addition product, and (B) converting the addition product into a high molecular weight compound within 24 hours after beginning the addition reaction (A) by adding an oxidizing agent to the addition reaction mixture or by subjecting the addition reaction mixture to anodic oxidation with an electrode to give a quinone-amine compound. According to the present invention, the preparation rate of the scale deposition preventing agent of the quinone-amine compound can be remarkably increased, the yield can be increased, and the obtained compound has excellent properties.

16 Claims, 1 Drawing Sheet

SCALE DEPOSITION PREVENTING AGENT

BACKGROUND OF THE INVENTION

The present invention relates to a process for preparing a scale deposition preventing agent, and more particularly to a process for preparing a scale deposition preventing agent of a quinone-amine compound having a molecular weight of not less than 3000, which comprises subjecting an aromatic quinone and an aromatic diamine to addition reaction in a solvent medium having a solubility parameter of 8.5 to 24.0, and converting the addition product into a high molecular weight compound by adding an oxidizing agent or conducting anodic oxidation.

The scale deposition preventing agent according to the present invention is used in a process for emulsion-polymerizing an acrylate or a methacrylate monomer alone, a mixture thereof or a mixture of an acrylate or a methacrylate monomer as a main component and other copolymerizable monomers, wherein the amount of the acrylate monomer, methacrylate monomer or mixture thereof becomes not less than 60% by weight of the monomer mixture in the course of the emulsion polymerization by previously applying to an inner surface of a polymerization vessel and surfaces of attached instruments within the vessel.

An emulsion polymerization using an acrylic or a methacrylic acid ester (hereinafter referred to as "(meth)acrylate") monomer is popularly applied to a process for preparing an acrylonitrile-butadiene-styrene copolymer (ABS) or a methyl methacrylate-butadiene-styrene copolymer (MBS). In such a process, the polymerization is carried out in a manner of graft-polymerization using a butadiene rubber latex. As a result of the polymerization, since the formed polymer scale is adhesive, the scale is hardly removed from an inner surface of a polymerization vessel.

The deposition of the polymer scale is assumed to occur in the following manner. The (meth)acrylate monomers are dissolved in water, and then polymerized in water, which makes a latex unstable. In addition, since the (meth)acrylate monomers are hydrolyzed to acidify the polymerization system weakly, coagulation of the latex is promoted. For preventing the latex from the coagulation, a proper emulsifier is selected. It is very difficult, however, to carry out the polymerization in a stable state of the latex, because the quality of the produced polymer becomes degraded by the increase of the amount of the emulsifier. Therefore the partial coagulation of the latex cannot be avoided.

The coagulated latex is dissolved in the (meth)acrylate monomers to increase in stickiness. The sticky coagulated latex is adhered on surfaces of various parts in a polymerization vessel, and then the (meth)acrylate monomers contained in the latex are polymerized thereon to form a tough polymer scale deposition.

This causes many defects such as decrease in heat transfer efficiency through the inner wall of the vessel, decrease in yield, deterioration of products due to the admixing of the peeled scales, and reduction in operating rate of the vessel due to labors and time required for removing the scales from the surface.

In order to prevent the scale deposition, there was proposed a process wherein, in a process for emulsion-polymerizing an acrylate or a methacrylate monomer alone, a mixture thereof or a mixture of an acrylate or a methacrylate monomer as a main component and other copolymerizable monomers in the presence of water, an emulsifier and a polymerization initiator soluble in water or the monomers, wherein the amount of the acrylate monomer, methacrylate monomer or mixture thereof becomes not less than 60% by weight of the monomer mixture in the course of the emulsion polymerization; the improvement which comprises carring out the emulsion polymerization in a polymerization vessel having a film on an inner surface thereof and on surfaces of attached instruments within the vessel, the film being formed by applying a solution of an aromatic quinone-amine compound having an average molecular weight of not less than 3,000 in an organic solvent, the quinone-amine compound being prepared by subjecting an aromatic diamine and an aromatic quinone to addition reaction in an organic solvent medium having a solubility parameter of 9.0 to 12.2, in U.S. Pat. No. 4,517,344 by the present inventor.

However, the process described in U.S. Pat. No. 4,517,344 has defects that the preparation rate of a quinone-amine compound is very slow, that is, a long time as about 30 days is required until the precipitation of the desired product begins, and the yield is very low, i.e. from 2 to 23%.

It is an object of the present invention to provide a process for preparing a scale deposition preventing agent solving the above-mentioned defects.

This and other objects of the present invention will becomes apparent from the description hereafter.

SUMMARY OF THE INVENTION

It has now been found out that only when an oxidizing agent is added to an addition reaction mixture of an aromatic quinone and an aromatic diamine in a suitable amount or the reaction mixture is subjected to anodic oxidation at a relatively early time, that is, immediately or within 24 hours after the beginning of the addition reaction for promoting the rate of conversion into a high molecular weight compound, the preparation rate can be remarkably increased, i.e. the desired product can be obtained immediately or within 24 hours, the yield can be increased, i.e. the yield is usually not less than 30%, and the obtained product has excellent properties compared to conventional products from the points of the effect for preventing scale deposition and the number of times that one product can prevent the scale deposition.

In accordance with the present invention, there is provided a process for preparing a scale deposition preventing agent of a quinone-amine compound suitable for use in a polymerization of acrylic or methacrylic acid ester monomers, which comprises (A) subjecting an aromatic quinone and an aromatic diamine to addition reaction in a solvent having a solubility parameter of 8.5 to 24.0 to give an addition product, and (B) subjecting to a reaction for converting the addition product into a high molecular weight compound within 24 hours after beginning the addition reaction (A) by adding an oxidizing agent to the addition reaction mixture or by subjecting the addition reaction mixture to anodic oxidation with an electrode, to give a quinone-amine compound.

DETAILED DESCRIPTION

Figure 1:
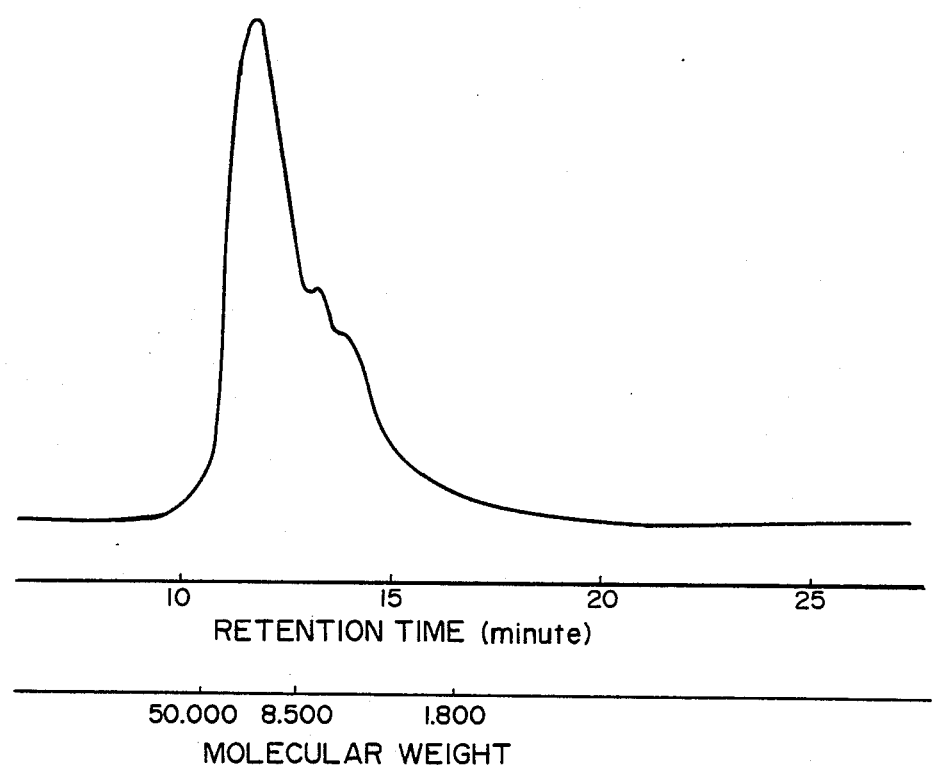
FIG. 1 shows a chart of destribution of molecular weight, which is obtained in the analysis as to a qui-

The scale deposition preventing agent prepared according to the present invention is the quinone-amine compound having an average molecular weight of not less than 3000, preferably not less than 8,000, which is prepared from the aromatic quinone and the aromatic diamine by addition reaction in the solvent having a solubility parameter (hereinafter referred to as "sp") of 8.5 to 24.0, and then reaction for converting the addition product into the high molecular weight compound by adding the oxidizing agent to the reaction mixture or by subjecting the reaction mixture to anodic oxidation with the electrode.

Examples of the aromatic quinone are, for instance, benzoquinone, naphthoquinone, phenanthraquinone, and the like. Furthermore, substituted quinone derivatives having on the aromatic ring at least one substituent such as chlorine atom, bromine atom, methyl group, amino group, an alkoxy group or hydroxyl group may be also employed. From a viewpoint of reactivity and the scale deposition preventing effect, an aromatic quinone having benzene ring, naphthalene ring or phenanthrene ring is preferably employed.

Examples of the aromatic diamines are, for instance, phenylenediamine, diaminonaphthalene, diaminoacridine, diaminopyridine, diaminopyrimidine, diaminofluorene, diaminoazobenzene, diaminobenzidine, diaminodiphenylamine, diaminotoluene, and substituted amine derivatives thereof having on the aromatic ring a substituent such as an alkyl group, an aryl group, an alkoxy group, a halogen atom, hydroxyl group, mercapto group or nitro group. From a viewpoint of reactivity and the scale deposition preventing effect, an aromatic diamine having benzene ring or naphthalene ring is preferably employed. It should be noted that the aromatic diamine having benzene ring must be carefully handled because many of the quinone-amine compounds prepared from the diamine have a carcinogenic activity regardless of a kind of the aromatic quinone.

In the present invention, it is important to select the solvent medium used in the preparation of the quinone-amine compound from viewpoints of reaction rate and yield as well as control of the molecular weight of the quinone-amine compound. The solvent medium must have an sp value of 8.5 to 24.0, preferably has a dielectric conductivity ($\epsilon$) of not less than 7. Examples of the solvent are, for instance, tetrahydrofuran (sp=9.32, $\epsilon$=7.58, hereinafter referred to as "THF"), dimethylformamide (sp=12.0, $\epsilon$=36.71, hereinafter referred to as "DMF"), dimethylacetamide (sp=11.0, $\epsilon$=37.8, hereinafter referred to as "DMAc"), acetonitrile (sp=11.9, $\epsilon$=37.5), acetone (sp=9.71, $\epsilon$=21.45), methyl ethyl ketone (sp=9.04, $\epsilon$=15.45), diethyl ketone (sp=10.03, $\epsilon$=17.00), methyl isobutyl ketone (sp=9.56, $\epsilon$=13, 11), methyl n-butyl ketone (sp=9.92, $\epsilon$=12.2), methyl n-propyl ketone (sp=9.98, $\epsilon$=15.1), dioxane (sp=9.73, $\epsilon$=2.21), methanol (sp=14.5, $\epsilon$=33.2), ethanol (sp=12.7, $\epsilon$=27.0), acetic acid (sp=12.8, $\epsilon$=9.7), pyridine (sp=10.6, $\epsilon$=12.4), toluene (sp=8.9, $\epsilon$=2.39), benzene (sp=9.2, $\epsilon$=2.28), xylene (sp=from 8.8 to 9.0, $\epsilon$=from 2.2 to 2.6), propanol (sp=from 10.2 to 10.7, $\epsilon$=20.1), chlorobenzene (sp=9.5, $\epsilon$=5.9), chloroform (sp=9.2, $\epsilon$=4.81), ethyl acetate (sp=9.0, $\epsilon$=6.12), n-butyl alcohol (sp=from 9.7 to 10.1, $\epsilon$=19.2), dimethyl sulfoxide (sp=13.2, $\epsilon$=45), water (sp=23.8, $\epsilon$=81), a mixture thereof, and the like.

The scale deposition preventing agent according to the present invention is applied to the emulsion polymerization system in which the amount of the (meth)acrylate monomers becomes not less than 60% by weight of the monomer mixture in the course of the polymerization. For using in such polymerization system, it is necessary that the quinone-amine compound has an average molecular weight of not less than 3000, preferably not less than 8000. When the average molecular weight of the quinone-amine compound is less than 3000, the compound is partially or wholly dissolved in the (meth)acrylate monomer. As a result, not only the desired effect of the quinone-amine compound cannot be obtained, but also the quality of the (meth)acrylate polymer product deteriorates. The molecular weight of quinone-amine compound need be varied according to polymerization condition. For instance, the molecular weight of the compound should be made large in case of increasing the amount of the (meth)acrylate monomers or in case where the contamination of the product with the dissolved quinone-amine compound must be avoided, because the solubility of the scale deposition preventing agent becomes large as the increase in amount of the (meth)acrylate monomers.

The molecular weight of the quinone-amine compound can be varied by selecting the solvent medium, by controlling an amount of the oxidizing agent, or by controlling anodic oxidation condition (controlling a quantity of electricity). Also, the combination thereof can be used.

When the molecular weight is controlled by selecting the solvent medium, in order to obtain a quinone-amine compound having a small molecular weight, an alcohol or water is used as at least one component of the solvent medium in a suitable amount. Preferable alcohol is methanol (sp=14.5) or ethanol (sp=12.7). When the alcohol is used as one component of a mixed solvent, it may be added either before or after the addition reaction, it is preferable to add the alcohol or water before the addition reaction in case of the rapid reaction rate. On the contrary, in order to obtain a quinone-amine compound having a large molecular weight, the addition reaction is carried out without using alcohols and water.

When the molecular weight of the quinone-amine compound is controlled by controlling the amount of the oxidizing agent or the anodic reaction condition, the addition reaction is carried out in a solvent having no alcohol and water, for instance, in DMF, DMAc, THF, or the like. The reaction for converting the addition product into the high molecular weight compound is stopped by controlling the total amount of the oxidizing agents or controlling the time of the anodic oxidation to give a quinone-amine compound having a desired molecular weight.

A preferred embodiment of the preparation of the quinone-amine compound is explained hereinbelow, but the present invention is not limited thereto.

In the above-mentioned reaction medium, the aromatic quinone and the aromatic diamine are dissolved so that the amount of the aromatic quinone is about 1 to about 5 moles, preferably about 1 to about 3 moles per mole of the aromatic diamine.

The addition reaction begins immediately and the color of the reaction mixture changes blackly. Then, the conversion into the high molecular weight compound is carried out with the oxidizing agent having a suitable amount or by the anodic oxidation.

The addition reaction is continued at a temperature of about 10° to about 90° C., preferably 20° to 70° C. with or without stirring, preferably with stirring. The reaction for converting the addition product into a high molecular weight is carried out within 24 hours after beginning the addition reaction. The precipitation of the reaction product usually begins immediately or within 24 hours after beginning the conversion into the high molecular weight compound.

In case of using the oxidizing agent, the resulting reaction mixture having the objective compound precipitated is added to an aqueous solution in which a reductant such as sodium hydrogensulfite is dissolved in an amount of at least three times the total amount of the oxidizing agent to complete the reduction reaction of the unreduced oxidizing agent. Then, the precipitate of the quinone-amine compound is collected by filtration, washed thoroughly with distilled water and then with the reaction medium used in the addition reaction (except for the alcohol and water) or methyl methacrylate (hereinafter referred to as "MMA"), preferably MMA so that the washing solvent is not almost colored, and dried under reduced pressure. According to the process of the invention, the quinone-diamine compound can be obtained in a yield of not less than 30%.

When the oxidizing agent is a solid state or liquid state, the oxidizing agent can be added in the state of a solution wherein the oxidizing agent is dissolved or diluted in a solvent such as water, DMF or DMAc, or in the state of the solid or undiluted liquid as it is. When the oxidizing agent is a gas state, the agent is made a state of fine bubbles through a porous material and is bubbled. The oxidizing agent can be added at once, separately or continuously. Preferably, the agent is added at once from the viewpoint of preparation of the quinone-diamine compound having a sharp molecular weight distribution. It is effective to use a mixture of at least two kinds of oxidizing agents. There is, for instance, a method in which an oxidizing agent such as an ferric salt, a cupric chloride or a cupric sulfate is added in a small amount, and then a gas containing oxygen is bubbled or hydrogen peroxide is added.

The amount of the oxidizing agent is suitably determined depending on an amount of the starting materials. Usually, the amount is within the range of 0.0001 to 5,000 parts by weight per part of the total starting materials, preferably from 0.1 to 500 parts by weight, more preferably from 1 to 50 parts by weight. When the gaseous oxidizing agent is used, the supplied amount is not particularly limited, and is suitably determined with observing the state of the conversion into the high molecular weight compound, since the gaseous oxidizing agent is usually added by bubbling and accordingly the oxidiging agent is mostly removed from the reaction system without participating the conversion into the high molecular weight compound. Usually, the amount of the gaseous oxidizing agent is from 50 to 500,000 parts by weight per part of the total starting materials.

As the oxidizing agent used in the conversion into the high molecular weight compound, an oxidizing agent relatively mild is used. Examples of the oxidizing agent are, for instance, chromic acid, lead tetraacetate, lead dioxide, mercury (II) oxidie, a halogen, a halogen acid, oxygen, hydrogen peroxide, an organic peroxide such as t-butyl hydroperoxide or benzoyl peroxide, nitric acid, dinitrogen tetroxide, 2,3-dichloro-5,6-dicyano-1,4-benzoquinone (DDQ), o-chloranil, chloranil, silver (I) oxide, silver (I) carbonate, ferric salt such as ferric chloride, thalium (III) salt, ammonium cerium (IV) oxalate, nickel peroxide, chlorogold (III) acid, manganese dioxide, periodic acid, N-halocarboxylic acid amide, hypohalogenous acid ester, iodosyl compound, cupric chloride, cupric sulfate or peroxoborate, a mixture thereof and the like cupric chloride and ferric salt are preferable.

After adding the oxidizing agent, the rate of the conversion into the high molecular weight compound can be controlled by adding an acid such as hydrochloric acid or sulfuric acid to the reaction system to acidify, or by adding an alkali such as sodium hydroxide or potassium hydroxide to the reaction system to make the reaction system alkaline. When using the acid, the conversion rate becomes rapid and when using the alkali, the conversion rate becomes slow. When using the alkali, the medium of the addition reaction must be carefully selected because the alkali is decomposed or reacted with the medium depending on the kinds of the medium used.

When the addition product is converted into the high molecular weight compound by the anodic oxidation, an electrode such as platinum electrode or carbon electrode which is usually used in an electrolysis is inserted into the reaction system and the reaction system is stirred. As the solvent in the anodic oxidation, all solvents used in the addition reaction, e.g. methanol, ethanol, DMAc, and the like can be used.

The reaction for converting the addition product into the high molecular weight compound is continued at the same temperature as in the addition reaction until the crystals of the desired compound is precipitated. In order to condact the conversion rapidly, it is effective to add an alkali such as potassium hydroxide or sodium carbonate in a small amount to the reaction system. In such a case, mediums which are not decomposed or reacted with the alkali must be selected as the addition reaction solvent. An electrode voltage and anodic oxidation time are suitably controlled with observing a value of electric current or the converion state. The anodic oxidation is generally carried out under conditions of about 10 to about 500 mA in voltage, about 1 to about 20 V in current, and 1 to 100 hours in oxidation time.

It is effective that the anodic oxidation is combined with the addition of the oxidizing agent for converting the addition product into the high molecular weight compound. For instance, after adding the oxdizing agent such as DDQ or chloranil in a small amount, the anodic oxidation is carried out to reproduce the oxidizing agent.

The applicable polymerization system for the obtained quinone-amine compound can be confirmed by determining a solubility of the quinone-amine compound for various monomer mixtures in the test polymerization systems prepared according to various practical polymerization systems.

In order to enhance the scale deposition preventing effect, hydrophilic property is given to the quinone-amine compound.

In general, when a water repellent compound is applied to the inner surface of the vessel, a lipophilic monomer is easy to adhere to the surface, and then polymerized to form a polymer scale thereon. Accordingly, by giving the hydrophilic property to the compound, the compound exhibits the increased scale deposition preventing effect. This phenomenon is presumed that the surface of the vessel increases in wettability to water by applying the hydrophilic compound to form a water film thereon, whereby the polymerization on the surface is inhibited and the access of the produced polymer is also prevented. In order to obtain the hydrophilic property, it is necessary that the aromatic quinone-amine compound has a hydrophilic group such as —OH, —NH$_2$ or —NH—.

When the quinone-amine compound is subjected to reduction treatment, the hydrophilic property is far more enhanced. There is a possibility that the quinone-amine compound is already reduced in the reduction reaction of the oxidizing agent, but the reduction treatment is conducted again for completely reducing the compound. The quinone-amine compound can be reduced, for instance, by dissolving the compound in the solvent for application, which is explained hereinafter, in an amount of not less than 0.5% by weight, adding thereto an aqueous solution of a reducing agent such as sodium hydrosulfite in an amount of 1 to 3 times the weight of the quinone-amine compound, and stirring at ordinary temperature under ordinary pressure, or by adding the finely pulverized quinone-amine compound having a particle size of not more than about 150 μm to an aqueous solution of a reducing agent in an amount of ⅓ to 1 time the weight of the reducing agent, and stirring the mixture. After filtrating the reaction mixture, the filtrate is washed with water and dried under reduced pressure.

The quinone-amine compound is almost insoluble in water, alcohols, aliphatic hydrocarbons, aromatic hydrocarbons, halogenated hydrocarbons and, of course, monomer mixtures to be polymerized.

The quinone-amine compound is used in the state of a film. The film of the quinone-amine compound may be formed, for instance, according to a process (a) in which a dispersion of the finely pulverized quinone-amine compound is applied, and then dried or molten; a process (b) in which a molten quinone-amine compound is applied; or a process (c) in which an organic solution prepared by dissolving the quinone-amine compound in an organic solvent is applied. However, since it is difficult to form a uniform and smooth film according to the process (a) and also the process (b) is difficult to be practiced in an industrial scale, there is employed the process (c) in which the quinone-amine compound is dissolved in an organic solvent and applied to an inner surface of a polymerization vessel and to surfaces of attached instruments within the vessel such as mixing blades and baffle plates.

The following properties should be considered upon the selection of the solvent which dissolves the quinone-amine compound, i.e. scale deposition preventing agent.

(1) Large solubility for ensuring the desired thickness of the film formed on the surfaces (2) Low boiling point for easy drying (3) Small surface tension for uniform application on the surface As a solvent satisfying the above all requirements, an organic solvent having an sp value of 9.0 to 14.5 is preferred. Examples of such organic solvents are, for instance, a primary amide such as DMF or DMAc; a sulfoxide such as dimethylsulfoxide; a ketone such as acetone, methyl ethyl ketone, diethyl ketone or methyl n-propyl ketone; a nitrile compound such as acetonitrile; pyridine; morpholine; THF; a mixture thereof; and the like. The solvent is selected depending on the molecular weight of the applying quinone-amine compound, a concentration of the applying solution, safety handling, workability, and the like. When a solvent having a high boiling point must be used, it is necessary that an applied film is dried under reduced pressure by warming.

With respect to the surface tension (3), a uniform film is not formed unless a surface tension of the solvent can easily wet the surface. For instance, when a solution of the quinone-amine compound is applied to a stainless steel (SUS 304), the surface tension of the solvent must be below 30 dyne/cm. In case where the solvent having a large surface tension must be employed, the surface tension of the solvent should be lowered by adding a solvent having a small surface tension to the solvent having the large surface tension.

Examples of the solvents having a small surface tension are, for example, methyl n-propyl ketone, amyl acetate, n-butanol, THF, ethanol, and the like. An amount of the solvent having a small surface tension is 20 to 50% by volume to the solvent having a large surface tension. Further, the uniform application to a stainless steel can also be achieved by adding an organic acid such as thiosalicylic acid, benzonic acid, palmitic acid or stearic acid; a weakly acidic inorganic acid such as sulfamic acid; or a chelating agent such as disodium ethylenediaminetetraacetate in an amount of 0.1 to 0.3% by weight to the weight of the quinone-amine compound. In any case, however, since the solubility of the mixed solvent is reduced somewhat rather than that of the solvent alone, the most profitable measure should be searched by an experiment.

The scale deposition preventing agent is applyed on the surfaces within the vessel in an amount within the range of 0.01 to 5 g/m$^2$, preferably 0.1 to 1.0 g/m$^2$ by spraying, brushing, or the like. The agent may be applied beyond 5 g/m$^2$ insofar as it has a bad influence on the film formation or polymerization of the (meth)acrylate monomer.

The amount of the solution of the scale deposition preventing agent varies depending on a concentration of the scale deposition preventing agent in the applying solution. Namely, when the concentration is low, the applying solution must be applied several times because only a thinner film of the agent is formed at one application. In such a case, since the applying solution is floated in the vessel and falls down to stay in the bottom portion of the vessel on each application, a large amount of the solution is required. Moreover, a long time is required for the application and the drying, which makes a profitability reduced. Accordingly, it is preferable that a concentration of the scale deposition preventing agent in the applying solution is higher, more preferably not less than 0.5% by weight, especially from 1.0 to 2.0% by weight.

As a film forming method other than the above-mentioned method in which the quinone-amine compound is dissolved in the suitable solvent and the solution is applied to form the film, there is adopted, for instance, a method for forming a film by reaction, in which the reaction mixture of the aromatic quinone compound and the aromatic diamine compound before adding the oxidizing agent is applied to the surface within the vessel and then the oxidizing agent solution is sprayed thereon to convert the reaction product to the high molecular weight compound on the surface, thus resulting in formation of the film. The above method becomes able to adopt since the conversion into the high molecular weight compound becomes remarkably rapid by adopting the process of the present invention. However, in the method for forming the film by reaction, it is necessary after forming the film to wash the film with water for removing the oxidizing agent or to treat the film with a solution containing the reductant for reducing the quinone-amine compound. Moreover, the reaction mixture is liable to be acidified due to kinds of the oxidizing agents used. Accordingly, in case of using the stainless steel polymerization vessel, the oxidizing agents must be selected carefully from the above-mentioned viewpoints.

The polymerization system in which the quinone-amine compound prepared according to the present invention is to be used an emulsion polymerization system comprising the acrylate or the methacrylate monomer alone, or a mixture thereof, or a mixture containing the (meth)acrylate monomer in an amount of not less than 60% by weight of the monomer mixture in the course of the polymerization.

In general a polymerization vessel is charged with a monomer mixture according to the following method. That is, there are, for instance, a method in which a vessel is charged with the monomer mixture having a composition corresponding to the desired composition of the product, or a method in which an additional monomer mixture is added at one time or at several times or continuously when the polymerization reaction is proceeded to some extent. In the latter method, there is a case where an amount of the (meth)acrylate monomer is beyond 60% by weight in the monomer mixture, even if a content of the (meth)acrylate units is below 60% by weight in the polymer product. Such a case is also included in the present invention. The term "(meth)acrylate unit" used herein means a recurring unit derived from (meth)acrylate monomer in the polymer product.

As mentioned above, the polymerization system using the scale deposition preventing agent according to the present invention is the most difficult system to prevent the scale deposition. Therefore polymer scale deposition can be avoided in every emulsion polymerization system and dispersion polymerization system.

Examples of the (meth)acrylate monomers are, for instance, an acrylate such as methyl acrylate, ethyl acrylate, butyl acrylate, octyl acrylate, dodecyl acrylate, cyclohexyl acrylate, β-hydroxyethyl acrylate, glycidyl acrylate, cyanoethyl acrylate or alkoxycarbonylmethyl acrylate; a methacrylate such as methyl methacrylate, ethyl methacrylate or butyl methacrylate, and the like. Examples of the other copolymerizable monomers employed with the above (meth)acrylate monomers are, for instance, styrene, a styrene derivative such as α-methylstyrene, orthochlorostyrene or vinyltoluene; a diolefine such as vinylnaphthaline, butadiene, isoprene or chloroprene; a nitrile derivative such as acrylonitrile or methacrylonitrile; vinyl acetate, vinyl chloride, vinylidene chloride; and the like.

Examples of the emulsifiers are, for instance, an anionic surfactant such as sodium lauryl sulfate, sodium stearate, sodium dodecylbenzenesulfonate, sodium palmitate, potassium oleate, potassium rhodinate, a paraffine sulfonic acid ester or a naphthalene sulfonic acid ester; a nonionic surfactant such as sorbitan monolaurate, a polyoxyethylenealkyl ether or polyethyleneglycol monolaurate; and the like.

Examples of the polymerization initiators are, for instance, a water soluble persulphate such as potassium persulfate or ammonium persulfate; an oil soluble polymerization initiator such as cumenehydroperoxide, paramenthanehydroperoxide, t-butylhydroperoxide, t-butylperoxiisopropyl carbonate or α,α'-azobisisobutyronitrile; a redox polymerization initiator, and the like.

If necessary, a polymerization auxiliary such as a chain transfer agent or an electrolyte may be admixed.

The present invention is more particularly described and explained by means of the following Examples, in which all percents and parts are percents by weight and parts by weight, respectively, unless otherwise noted. It is to be understood that the present invention is not limited to the Examples and various changes and modifications may be made in the invention without departing from the spirit and scope thereof.

EXAMPLE 1

A reaction vessel was charged with 90 parts of methanol and 10 parts of THF, and then 5 parts of β-naphthoquinone and 5 parts of 1,8-diaminonaphthalene were added at 30° C. with stirring. The color of the reaction mixture was changed to reddish black when 1,8-diaminonaphthalene was added. After 10 minutes, 17.1 parts of powder of ferric chloride hexahydrate was added to the reaction mixture, and the reaction was proceeded for 30 seconds at 30° C. Then the stirring was stopped and the resulting mixture was added to 500 parts of an aqueous solution containing 100 parts of sodium hydrogensulfite to stop the reaction. The precipitate was collected by filtration, thoroughly washed with distilled water to remove ferric chloride hexahydrate, repeatedly washed with MMA until MMA was not almost colored, and then dried under reduced pressure to give a quinone-amine compound.

As a result of analyzing the quinone-amine compound obtained by gel permeation chromatography (hereinafter referred to as "GPC"), a chart shown in FIG. 1 was obtained. Calculating from FIG. 1, the average molecular weight of the compound was about 15000.

The measuring conditions were as follows:
Column: GPC AD-802/S×2 (Polystyrene gel available from SHOWA DENKO K.K. as the tradename of "SHODEX")
Carrier: 0.01 m LiBr/DMF: 1.0 ml/min
Detector: Differential refractometer (RI×4)

Also, the yield of the quinone-amine compound to the starting materials was about 75%.

EXAMPLE 2

A reaction vessel was charged with 180 parts of methanol and 20 parts of THF, and then 5 parts of p-benzoquinone and 5 parts of 1,8-diaminonaphthalene were added at 50° C. with stirring. The color of the reaction mixture was changed to reddish black when 1,8-diaminonaphthalene was added. After 10 minutes, 160 parts of an aqueous solution containing 10.5 parts of cupric chloride was added to the reaction mixture, and the reaction was proceeded for 5 hours at 50° C. Then the stirring was stopped and resulting mixture was added to 1000 parts of an aqueous solution containing 50 parts of sodium hydrogensulfite to stop the reaction. The precipitate was collected by filtration, thoroughly washed with distilled water to remove cupric chloride, repeatedly washed with MMA until MMA was not almost colored, and then dried under reduced pressure to give a quinone-amine compound. The average molecular weight of the quinone-amine compound measured by GPC was about 20000. Also, the yield of the quinone-amine compound was about 60%.

EXAMPLE 3

A reaction vessel was charged with 200 parts of THF, and then 5 parts of p-benzoquinone and 5 parts of p-phenylenediamine were added at 30° C. with stirring. The color of the reaction mixture was changed to reddish black when p-phenylenediamine was added. After 10 minutes, 10 parts of powder of ferric chloride hexahydrate was added to the reaction mixture, and the reaction was proceeded for 20 minutes at 30° C. Then the stirring was stopped and resulting mixture was added to 500 parts of an aqueous solution containing 50 parts of sodium hydrogensulfite to stop the reaction. The precipitate was collected by filtration, thoroughly washed with distilled water to remove ferric chloride hexahydrate, repeatedly washed with THF until THF was not almost colored, and then dried under reduced pressure to give a quinone-amine compound. The average molecular weight of the quinone-amine compound measured by GPC was about 20000. Also, the yield of the quinone-amine compound was about 55%.

EXAMPLE 4

A reaction vessel was charged with 50 parts of THF and 30 parts of methanol, and then 5 parts of $\beta$-naphthoquinone and 5 parts of 1,8-diaminonaphthalene were added at 30° C. with stirring. The color of the reaction mixture was changed to reddish black when 1,8-diaminonaphthalene was added. After 30 minutes, 50 parts of 3% aqueous solution of hydrogen peroxide was added to the reaction mixture, and the reaction was proceeded for 3 hours at 30° C. Then the stirring was stopped and resulting mixture was added to 500 parts of an aqueous solution containing 40 parts of sodum hydrogensulfite to stop the reaction. The precipitate was collected by filtration, thoroughly washed with distilled water, repeatedly washed with MMA until MMA was not almost colored, and then dried under reduced pressure to give a quinone-amine compound. The average molecular weight of the quinone-amine compound measured by GPC was about 8000. Also, the yield of the quinone-amine compound was about 25%.

EXAMPLE 5

A reaction vessel was charged with 100 parts of THF, and then 1 part of 9,10-phenanthrenequinone and 1 part of 1,2-diaminonaphthalene were added at 30° C. with stirring. The color of the reaction mixture was changed to yellowish and reddish brown when 1,2-diamino-naphthalene was added. After 2 hours, 100 parts of an aqueous solution containing 30 parts of cupric sulfate was added to the reaction mixture, and the reaction was proceeded for 10 hours at 30° C. Then the stirring was stopped and resulting mixture was added to 1000 parts of an aqueous solution containing 100 parts of sodium hydrogensulfite to stop the reaction. The precipitate was collected by filtration, thoroughly washed with distilled water to remove cupric sulfate, repeatedly washed with MMA until MMA was not almost colored, and then dried under reduced pressure to give a quinone-amine compound. The average molecular weight of the quinone-amine compound measured by GPC was about 10000. Also, the yield of the quinone-amine compound was about 60%.

EXAMPLE 6

A reaction vessel was charged with 90 parts of acetone and 90 parts of ethanol, and then 3 parts of $\beta$-naphthoquinone and 3 parts of 1,8-diaminonaphthalene were added at 20° C. with stirring. The color of the reaction mixture was changed to reddish black when 1,8-diaminonaphthalene was added. After 10 minutes, 100 parts of an aqueous solution containing 60 parts of ferric chloride was added to the reaction mixture, and the reaction was proceeded for 30 minutes at 30° C. Then the stirring was stopped and resulting mixture was added to 1000 parts of an aqueous solution containing 200 parts of sodium hydrogensulfite to stop the reaction. The precipitate was collected by filtration, thoroughly washed with distilled water to remove ferric chloride, repeatedly washed with acetone until acetone was not almost colored, and then dried under reduced pressure to give a quinone-amine compound. The average molecular weight of the quinone-amine compound measured by GPC was about 8000. Also, the yield of the quinone-amine compound was about 80%.

EXAMPLE 7

A reaction vessel was charged with 50 parts of THF and 45 parts of methanol, and then 5 parts of $\beta$-naphthoquinone and 5 parts of 1,8-diaminonaphthalene were added at 30° C. with stirring. The color of the reaction mixture was changed to reddish black when 1,8-diaminonaphthalene was added. After 30 minutes, 7 parts of powder of ferric chloride hexahydrate was added to the reaction mixture, and the reaction was proceeded for 2 hours at 30° C. Then the stirring was stopped and resulting mixture was added to 1000 parts of an aqueous solution containing 50 parts of sodium hydrogensulfite to stop the reaction. The precipitate was collected by filtration, thoroughly washed with distilled water to remove ferric chloride hexahydrate, repeatedly washed with MMA until MMA was not almost colored, and then dried under reduced pressure to give a quinone-amine compound. The average molecular weight of the quinone-amine compound measured by GPC was about 13000. Also, the yield of the quinone-amine compound was about 70%.

EXAMPLE 8

A reaction vessel was charged with 90 parts of methanol and 10 parts of THF, and then 5 parts of $\beta$-naphthoquinone and 5 parts of 1,8-diaminonaphthalene were added at 60° C. with stirring. The color of the reaction mixture was changed to reddish black when 1,8-diaminonaphthalene was added. After 10 minutes, 15 parts of an aqueous solution containing 3 parts of ferric chloride was added to the reaction mixture, air was passed into the reaction mixture at a flow rate of 30 ml/min. through a porous Teflon tube (Teflon being trademark of E. I. du pont de Nemours and Co.) (porous polytetrafluoroethylene tube commercially available from Sumitomo Denko Kabushiki Kaisha under a tradename "floropore"; an inside diameter: 3 mm, an outside diameter: 4 mm, a porosity: 60%, pore size: 0.1 $\mu$m) of 10 cm in length with one end being closed, and the reaction was proceeded for 10 hours at 60° C. Then the stirring was stopped. The reaction mixture was refluxed by a reflux condenser using chilled water with adding the solvent since the solvent was evaporated during the reflux. The resulting mixture was added to 500 parts of an aqueous solution containing 50 parts of sodium hydrogensulfite to stop the reaction. The precipitate was collected by filtration, thoroughly washed with distilled water to remove ferric chloride, repeatedly washed with MMA until MMA was not almost colored, and then dried under reduced pressure to give a quinone-amine compound. The average molecular weight of the quinone-amine compound measured by GPC was about 9000. Also, the yield of the quinone-amine compound was about 45%.

EXAMPLE 9

A reaction vessel was charged with 90 parts of methanol and 10 parts of THF, and then 5 parts of β-naphthoquinone and 5 parts of 1,8-diaminonaphthalene were added at 30° C. with stirring. The color of the reaction mixture was changed to reddish black when 1,8-diaminonaphthalene was added. After 10 minutes, 5 parts of powder of ferric chloride hexahydrate was added to the reaction mixture, to which 20 parts of 3% aqueous solution of hydrogen peroxide was added and the reaction was proceeded for 15 minutes at 30° C. Then the stirring was stopped and resulting mixture was added to 500 parts of an aqueous solution containing 50 parts of sodium hydrogensulfite to stop the reaction. The precipitate was collected by filtration, thoroughly washed with distilled water to remove ferric chloride hexahydrate, repeatedly washed with MMA until MMA was not almost colored, and then dried under reduced pressure to give a quinone-amine compound. The average molecular weight of the quinone-amine compound measured by GPC was about 12000. Also, the yield of the quinone-amine compound was about 35%.

EXAMPLE 10

A reaction vessel was charged with 90 parts of methanol, 10 parts of DMAc and 0.1 part of potassium hydroxide, and then 5 parts of p-quinone and 5 parts of 1,8-diaminonaphthalene were added at 30° C. with stirring. The color of the reaction mixture was changed to reddish black when 1,8-diaminonaphthalene was added. After 1 hour, a carbon electrode was put into the reaction mixture and anodic oxidation was carried out under conditions of 10 V in voltage and about 120 mA in electric current for 23 hours. Then, the stirring was stopped. During the anodic oxidation, gas was produced at the cathode. The precipitate was collected by filtration, thoroughly washed with distilled water, repeatedly washed with MMA until MMA was not almost colored, and then dried under reduced to give a quinone-amine compound. The average molecular weight of the quinone-amine compound measured by GPC was about 13000. Also, the yield of the quinone-amine compound was about 25%.

EXAMPLE 11

In 100 parts of DMAc was dissolved 0.7 part of the quinone-amine compound prepared in each Examples 1 to 10. The reduction reaction of the compound was conducted by adding 7 parts of 20% aqueous soluion of sodium hydrogensulfite and stirring the mixture for 5 hours at ordinary temperature under ordinary pressure. The filtrate obtained by filtration of the reaction mixture was used as the applying solution in the following test Examples.

Comparative Example 1

A reaction vessel was charged with 100 parts of THF, and then 15 parts of β-naphthoquinone and 5 parts of 1,8-diaminonaphthalene were added at 30° C. with stirring. The color of the reaction mixture was changed to reddish black when 1,8-diaminonaphthalene was added. After stopping stirring, the reaction was proceeded by allowing the reaction mixture to stand for 75 days at 30° C. The precipitated crystales were collected by filtration, repeatedly washed with THF until THF was not almost colored, and then dried under reduced pressure to give a quinone-amine compound. As a result of the measurement by GPC, the average molecular weight of the compound was about 8,500. Also, the yield of the quinone-amine compound was about 7%.

Comparative Example 2

A reaction vessel was charged with 200 parts of THF, and then 15 parts of p-benzoquinone and 5 parts of 1,8-diaminonaphthalene were added at 50° C. with stirring. The color of the reaction mixture was changed to reddish black when 1,8-diaminonaphthalene was added. After stopping stirring, the reaction was proceeded by allowing the reaction mixture to stand for 60 days at 50° C. The precipitated crystals were collected by filtration, repeatedly washed with THF until THF was not almost colored, and then dried under reduced pressure to give a quinone-amine compound. As a result of the measurement by GPC, the average molecular weight of the compound was about 8000. Also, the yield of the quinone-amine compound was about 5%.

Comparative Example 3

A reaction vessel was charged with 200 parts of THF, and then 5 parts of p-benzoquinone and 5 parts of p-phenylenediamine were added at 30° C. with stirring. The color of the mixture was changed to reddish black when p-phenylenediamine was added. After stopping stirring, the reaction was proceeded by allowing the reaction mixture to stand for 30 days at 30° C. The precipitated crystals were collected by filtration, repeatedly washed with THF until THF was not almost colored, and then dried under reduced pressure to give a quinone-amine compound. As a result of the measurement by GPC, the average molecular weight of the compound was about 7000. Also, the yield of the quinone-amine compound was about 20%.

Comparative Example 4

A reaction vessel was charged with 50 parts of THF and 30 parts of methanol, and then 5 parts of β-naphthoquinone and 5 parts of 1,8-diaminonaphthalene were added at 30° C. with stirring. The color of the mixture was changed to reddish black when 1,8-diaminonaphthalene was added. After stopping stirring, the reaction was proceeded by allowing the reaction mixture to stand for 30 days at 30° C. The precipitated crystals were collected by filtration, repeatedly washed with THF until THF was not almost colored, and then dried under reduced pressure to give a quinone-amine compound. As a result of the measurement by GPC, the average molecular weight of the compound was about 6000. Also, the yield of the quinone-amine compound was about 10%.

Comparative Example 5

A reaction vessel was charged with 100 parts of THF, and then 1 part of 9,10-phenanthrenequinone and 1 part of 1,2-diaminonaphthalene were added at 30° C. with stirring. The color of the mixture was changed to yellowish and reddish brown when 1,2-diaminonaphthalene was added. After stopping stirring, the reaction was proceeded by allowing the reaction mixture to stand for 120 days at 30° C. The precipitated crystals were collected by filtration, repeatedly washed with THF until THF was not almost colored, and then dried under reduced pressure to give a quinone-amine compound. As a result of the measurement by GPC, the average molecular weight of the compound was about 10000. Also, the yield of the quinone-amine compound was about 2%.

Comparative Example 6

A reaction vessel was charged with 90 parts of acetone and 90 parts of ethanol, and then 3 parts of β-naphthoquinone and 3 parts of 1,8-diaminonaphthalene were added at 20° C. with stirring. The color of the mixture was changed to reddish black when 1,8-diaminonaphthalene was added. After stopping stirring, the reaction was proceeded by allowing the reaction mixture to stand for 60 days at 20° C. The precipitated crystals were collected by filtration, repeatedly washed with acetone until acetone was not almost colored, and then dried under reduced pressure to give a quinone-amine compound. As a result of the measurement by GPC, the average molecular weight of the compound was about 4000. Also, the yield of the quinone-amine compound was about 15%.

Comparative Example 7

A reaction vessel was charged with 50 parts of THF and 45 parts of methanol, and then 5 parts of β-naphthoquinone and 5 parts of 1,8-diaminonaphthalene were added at 30° C. with stirring. The color of the mixture was changed to reddish black when 1,8-diaminonaphthalene was added. After stopping stirring, the reaction was proceeded by allowing the reaction mixture to stand for 15 days at 30° C., and then 0.5 part of ferric chloride was added to the reaction mixture to proceed the reaction for 15 days with stirring. The precipitated crystals were collected by filtration, repeatedly washed with THF until THF was not almost colored, and then dried under reduced pressure to give a quinone-amine compound. As a result of the measurement by GPC, the average molecular weight of the compound was about 3500. Also, the yield of the quinone-amine compound was about 23%.

Comparative Example 8

In 100 parts of DMAc was dissolved 0.7 part of the quinone-amine compound prepared in each Comparative Examples 1 to 7. The reduction reaction of the compound was conducted by adding 7 parts of 20% aqueous solution of sodium hydrogensulfite and stirring the mixture for 5 hours at ordinary temperature under ordinary pressure. The filtrate obtained by filtration of the reaction mixture was used as the applying solution in the following Test Examples.

The preparation rate, the yield and the average molecular weight of the quinone-amino compound prepared in each Examples and Comparative Examples are shown in Table 1.

TABLE 1

| Ex. No. | Preparation time of quinone-amine compound | Yield of quinone-amine compound (%) | Average molecular weight |
|---|---|---|---|
| Ex. 1 | 10.5 minutes | about 75 | about 15000 |
| Ex. 2 | 5 hours and 10 minutes | about 60 | about 20000 |
| Ex. 3 | 30 minutes | about 55 | about 20000 |
| Ex. 4 | 3.5 hours | about 25 | about 8000 |
| Ex. 5 | 12 hours | about 60 | about 10000 |
| Ex. 6 | 40 minutes | about 80 | about 8000 |
| Ex. 7 | 2.5 hours | about 70 | about 13000 |
| Ex. 8 | 10 hours and 10 minutes | about 45 | about 9000 |
| Ex. 9 | 25 minutes | about 35 | about 12000 |
| Ex. 10 | 24 hours | about 25 | about 15000 |
| Com. Ex. 1 | 75 days | about 7 | about 8500 |
| Com. Ex. 2 | 60 days | about 5 | about 8000 |
| Com. Ex. 3 | 30 days | about 20 | about 7000 |
| Com. Ex. 4 | 30 days | about 10 | about 6000 |
| Com. Ex. 5 | 120 days | about 2 | about 10000 |
| Com. Ex. 6 | 60 days | about 15 | about 4000 |
| Com. Ex. 7 | 30 days | about 23 | about 3500 |

TEST EXAMPLES 1 TO 35

The solution of quinone-amine shown in Table 2 was applied in the amount of 0.5 g/m$^2$ (solid matter) onto the surface of the inner wall of a 3 liter stainless steel polymerization vessel equipped with a stirrer and onto the surfaces of the stirring blades and the baffle plates attached within the vessel. After drying, the vessel was charged with 1150 g of styrene-butadiene copolymer latex (solid content: 30%), 650 g of demineralized water, 0.3 g of Rongalit, 0.02 g of disodium ethylenediaminetetraacetate and 0.01 g of ferrous sulfate, and then the temperature in the vessel was adjusted to 60° C. After addition of 150 g of 5% aqueous solution of potassium sulfate, the polymerization was carried out for 1.5 hours by adding 150 ml of methyl methacrylate containing 0.4 ml of cumenehydroperoxide with 50 ml thereof every 30 minutes to the reaction mixture. To the resulting reaction mixture was further added 0.8 ml of cumenehydroperoxide, and then the polymerization was carried out for one hour. After completion of the polymerization, the obtained polymer was taken out of the vessel and the inside of the vessel was observed. It was observed that the scale of the prepared polymer shown in Table 2 was adhered to the surfaces of the inner wall of the vessel. The total amount of scale deposited on all the surfaces in each Test Example is shown in Table 2.

Each applying solution used in Test Examples 1 to 34 was prepared by dissolving the quinone-amine compound shown in Table 2 in a solvent of DMAc so that the concentration of the compound was a values shown in Table 2.

In Table 2, there are also shown the results of the whole judgement from viewpoints of amount of the deposited scale, thickness, uniformity and peeling property of the film formed, and contamination to the produced polymer latex as the effect for preventing scale deposition.

⊙: Excellent

○: Good

Δ: Small amount of the scale deposited, but observing the contamination in product ×: Not satisfying the above judgements In Test Examples 6, 7, 12 and 14, the polymer latex was colored red by adding methyl methacrylate, and therefore the effect was estimated at Δ.

TABLE 2

| Test Ex. No. | Quinone-amine compound | Organic solvent | Concentration (%) | Condition for drying | Amount of scale (g/m$^2$) | Condition of formed film | Color of polymer latex | Effect for preventing scale deposition |
|---|---|---|---|---|---|---|---|---|
| Test Ex. 1 | Compound prepared in Com. Ex. 1 (non-reduced) | DMAc | 1.0 | 80° C. ×15 minutes under reduced pressure | 15 | uniform and not peeled off | milky | ○ |
| Test Ex. 2 | Compound prepared in Com. Ex. 2 (non-reduced) | DMAc | 0.6 | 80° C. × 15 minutes under reduced pressure | 12 | uniform and not peeled off | milky | ○ |
| Test Ex. 3 | Compound prepared in Com. Ex. 3 (non-reduced) | DMAc | 0.6 | 80° C. × 15 minutes under reduced pressure | 18 | uniform and not peeled off | milky | ○ |
| Test Ex. 4 | Compound prepared in Com. Ex. 4 (non-reduced) | DMAc | 1.2 | 80° C. × 15 minutes under reduced pressure | 25 | uniform and not peeled off | milky | ○ |
| Test Ex. 5 | Compound prepared in Com. Ex. 5 (non-reduced) | DMAc | 0.6 | 80° C. × 15 minutes under reduced pressure | 2 | uniform and not peeled off | milky | ◎ |
| Test Ex. 6 | Compound prepared in Com. Ex. 6 (non-reduced) | DMAc | 1.2 | 80° C. × 15 minutes under reduced pressure | 40 | uniform and not peeled off | thin red | Δ |
| Test Ex. 7 | Compound prepared in Com. Ex. 7 (non-reduced) | DMAc | 1.2 | 80° C. × 15 minutes under reduced pressure | 50 | uniform and not peeled off | thin red | Δ |
| Test Ex. 8 | Compound prepared in Com. Ex. 1 (reduced) | DMAc | 1.0 | 80° C. × 15 minutes under reduced pressure | 0 | uniform and not peeled off | milky | ○ |
| Test Ex. 9 | Compound prepared in Com. Ex. 2 (reduced) | DMAc | 0.6 | 80° C. × 15 minutes under reduced pressure | 0 | uniform and not peeled off | milky | ○ |
| Test Ex. 10 | Compound prepared in Com. Ex. 3 (reduced) | DMAc | 0.6 | 80° C. × 15 minutes under reduced pressure | 0 | uniform and not peeled off | milky | ○ |
| Test Ex. 11 | Compound prepared in Com. Ex. 4 (reduced) | DMAc | 1.2 | 80° C. × 15 minutes under reduced pressure | 19 | uniform and not peeled off | milky | ○ |
| Test Ex. 12 | Compound prepared in Com. Ex. 5 (reduced) | DMAc | 0.6 | 80° C. × 15 minutes under reduced pressure | 0 | uniform and not peeled off | milky | ◎ |
| Test Ex. 13 | Compound prepared in Com. Ex. 6 (reduced) | DMAc | 1.2 | 80° C. × 15 minutes under reduced pressure | 29 | uniform and not peeled off | thin red | Δ |
| Test Ex. 14 | Compound prepared in Com. Ex. 7 (reduced) | DMAc | 1.2 | 80° C. × 15 minutes under reduced pressure | 32 | uniform and not peeled off | thin red | Δ |
| Test Ex. 15 | Compound prepared in Ex. 1 (non-reduced) | DMAc | 1.0 | 80° C. × 15 minutes under reduced pressure | 1 | uniform and not peeled off | milky | ◎ |
| Test Ex. 16 | Compound prepared in Ex. 2 (non-reduced) | DMAc | 1.0 | 80° C. × 15 minutes under reduced pressure | 3 | uniform and not peeled off | milky | ◎ |
| Test Ex. 17 | Compound prepared in Ex. 3 (non-reduced) | DMAc | 1.0 | 80° C. × 15 minutes under reduced pressure | 8 | uniform and not peeled off | milky | ◎ |
| Test Ex. 18 | Compound prepared in Ex. 4 (non-reduced) | DMAc | 1.0 | 80° C. × 15 minutes under reduced pressure | 15 | uniform and not peeled off | milky | ○ |
| Test Ex. 19 | Compound prepared in Ex. 5 (non-reduced) | DMAc | 1.0 | 80° C. × 15 minutes under reduced pressure | 23 | uniform and not peeled off | milky | ○ |
| Test Ex. 20 | Compound prepared in Ex. 6 (non-reduced) | DMAc | 1.0 | 80° C. × 15 minutes under reduced pressure | 10 | uniform and not peeled off | milky | ◎ |
| Test Ex. 21 | Compound prepared in Ex. 7 (non-reduced) | DMAc | 1.0 | 80° C. × 15 minutes under reduced pressure | 28 | uniform and not peeled off | milky | ○ |
| Test Ex. 22 | Compound prepared in Ex. 8 (non-reduced) | DMAc | 1.0 | 80° C. × 15 minutes under reduced pressure | 13 | uniform and not peeled off | milky | ◎ |
| Test Ex. 23 | Compound prepared in Ex. 9 (non-reduced) | DMAc | 1.0 | 80° C. × 15 minutes under reduced pressure | 18 | uniform and not peeled off | milky | ◎ |
| Test Ex. 24 | Compound prepared in Ex. 10 (non-reduced) | DMAc | 1.0 | 80° C. × 15 minutes under reduced pressure | 12 | uniform and not peeled off | milky | ◎ |
| Test Ex. 25 | Compound prepared in Ex. 1 (reduced) | DMAc | 1.0 | 80° C. × 15 minutes under reduced pressure | 0 | uniform and not peeled off | milky | ◎ |

TABLE 2-continued

| Test Ex. No. | Solution of quinone-amine compound | | | Condition for drying | Amount of scale (g/m²) | Condition of formed film | Color of polymer latex | Effect for preventing scale deposition |
|---|---|---|---|---|---|---|---|---|
| | Quinone-amine compound | Organic solvent | Concentration (%) | | | | | |
| Test Ex. 26 | Compound prepared in Ex. 2 (reduced) | DMAc | 1.0 | 80° C. × 15 minutes under reduced pressure | 0 | uniform and not peeled off | milky | ◎ |
| Test Ex. 27 | Compound prepared in Ex. 3 (reduced) | DMAc | 1.0 | 80° C. × 15 minutes under reduced pressure | 1 | uniform and not peeled off | milky | ◎ |
| Test Ex. 28 | Compound prepared in Ex. 4 (reduced) | DMAc | 1.0 | 80° C. × 15 minutes under reduced pressure | 5 | uniform and not peeled off | milky | ◎ |
| Test Ex. 29 | Compound prepared in Ex. 5 (reduced) | DMAc | 1.0 | 80° C. × 15 minutes under reduced pressure | 15 | uniform and not peeled off | milky | ○ |
| Test Ex. 30 | Compound prepared in Ex. 6 (reduced) | DMAc | 1.0 | 80° C. × 15 minutes under reduced pressure | 3 | uniform and not peeled off | milky | ◎ |
| Test Ex. 31 | Compound prepared in Ex. 7 (reduced) | DMAc | 1.0 | 80° C. × 15 minutes under reduced pressure | 18 | uniform and not peeled off | milky | ○ |
| Test Ex. 32 | Compound prepared in Ex. 8 (reduced) | DMAc | 1.0 | 80° C. × 15 minutes under reduced pressure | 3 | uniform and not peeled off | milky | ◎ |
| Test Ex. 33 | Compound prepared in Ex. 9 (reduced) | DMAc | 1.0 | 80° C. × 15 minutes under reduced pressure | 8 | uniform and not peeled off | milky | ◎ |
| Test Ex. 34 | Compound prepared in Ex. 10 (reduced) | DMAc | 1.0 | 80° C. × 15 minutes under reduced pressure | 5 | uniform and not peeled off | milky | ◎ |
| Test Ex. 35 | None* | — | — | — | 315 | — | milky | X |

(Note):
*In Test Example 35, the scale deposition preventing agent was not used.

TEST EXAMPLES 36 TO 53

The solution of quinone-amine compound shown in Table 3 was applied in the amount of 0.5 g/m² (solid matter) onto the surfaces of the inner wall of a 8 liter stainless steel polymerization vessel equipped with a stirrer and onto the surfaces of the stirring blades and the baffle plates attached within the vessel. After drying, the vessel was charged with 1875 g of butadiene polymer latex (solid content: 40%), 1875 g of demineralized water, 0.075 g of disodium ethylenediaminetetraacetate, 0.0375 g of ferrous sulfate and 3 g of Rongalit, and then the temperature in the vessel was adjusted to 60° C. Then, the polymerization was carried out for two hours by continuously adding a mixture of 460 g of methyl methacrylate, 150 g of styrene and 140 g of acrylonitrile in which 4.5 g of cumenehydroperoxide was dissolved. To the resulting reaction mixture was further added 3 g of cumenehydroperoxide, and then the polymerization was carried out for two hours. After completion of the polymerization, the obtained polymer was taken out of the vessel and the inside of the vessel was observed. The total amount of scale deposited on all the surfaces in each Test Example is shown in Table 3.

Also, the effect for preventing scale deposition is shown in Table 3. In Test Examples 42 and 43, the polymer latex was colored red by adding methyl methacrylate, and therefore the effect was estimated at Δ.

TABLE 3

| Test Ex. No. | Solution of quinoneamine compound | | | Condition for drying | Amount of scale (g/m²) | Condition of formed film | Color of polymer latex | Effect for preventing scale deposition |
|---|---|---|---|---|---|---|---|---|
| | Quinoneamine compound | Organic solvent | Concentration (%) | | | | | |
| Test Ex. 36 | Compound prepared in Com. Ex. 1 (non-reduced) | DMF/n-butanol (90/10 by weight) | 1.0 | 80° C. × 15 minutes under reduced pressure | 30 | uniform and not peeled off | milky | ○ |
| Test Ex. 37 | Compound prepared in Com. Ex. 2 (non-reduced) | DMF/n-butanol (90/10 by weight) | 1.0 | 80° C. × 15 minutes under reduced pressure | 18 | uniform and not peeled off | milky | ○ |
| Test Ex. 38 | Compound prepared in Com. Ex. 3 (non-reduced) | DMF/n-butanol (90/10 by weight) | 1.0 | 80° C. × 15 minutes under reduced pressure | 48 | uniform and not peeled off | milky | ○ |
| Test Ex. 39 | Compound prepared in Com. Ex. 4 (non-reduced) | DMF/n-butanol (90/10 by weight) | 1.0 | 80° C. × 15 minutes under reduced pressure | 70 | uniform and not peeled off | milky | ○ |
| Test Ex. 40 | Compound prepared in Com. Ex. 5 (non-reduced) | DMF/n-butanol (90/10 by weight) | 1.0 | 80° C. × 15 minutes under reduced pressure | 15 | uniform and not peeled off | milky | ○ |
| Test Ex. 41 | Compound prepared in Com. Ex. 6 | DMF/n-butanol (90/10 by | 1.0 | 80° C. × 15 minutes | 100 | uniform and not | thin red | Δ |

TABLE 3-continued

| Test Ex. No. | Solution of quinoneamine compound | | | Condition for drying | Amount of scale (g/m²) | Condition of formed film | Color of polymer latex | Effect for preventing scale deposition |
| --- | --- | --- | --- | --- | --- | --- | --- | --- |
| | Quinoneamine compound | Organic solvent | Concentration (%) | | | | | |
| | (non-reduced) | weight) | | under reduced pressure | | peeled off | | |
| Test Ex. 42 | Compound prepared in Com. Ex. 7 (non-reduced) | DMF/n-butanol (90/10 by weight) | 1.0 | 80° C. × 15 minutes under reduced pressure | 87 | uniform and not peeled off | thin red | Δ |
| Test Ex. 43 | Compound prepared in Ex. 1 (non-reduced) | DMF/n-butanol (90/10 by weight) | 1.0 | 80° C. × 15 minutess under reduced pressure | 1 | uniform and not peeled off | milky | ◎ |
| Test Ex. 44 | Compound prepared in Ex. 2 (non-reduced) | DMF/n-butanol (90/10 by weight) | 1.0 | 80° C. × 15 minutes under reduced pressure | 3 | uniform and not peeled off | milky | ◎ |
| Test Ex. 45 | Compound prepared in Ex. 3 (non-reduced) | DMF/n-butanol (90/10 by weight) | 1.0 | 80° C. × 15 minutes under reduced pressure | 8 | uniform and not peeled off | milky | ◎ |
| Test Ex. 46 | Compound prepared in Ex. 4 (non-reduced) | DMF/n-butanol (90/10 by weight) | 1.0 | 80° C. × 15 minutes under reduced pressure | 27 | uniform and not peeled off | milky | ○ |
| Test Ex. 47 | Compound prepared in Ex. 5 (non-reduced) | DMF/n-butanol (90/10 by weight) | 1.0 | 80° C. × 15 minutes under reduced pressure | 37 | uniform and not peeled off | milky | ○ |
| Test Ex. 48 | Compound prepared in Ex. 6 (non-reduced | DMF/n-butanol (90/10 by weight) | 1.0 | 80° C. × 15 minutes under reduced pressure | 10 | uniform and not peeled off | milky | ◎ |
| Test Ex. 49 | Compound prepared in Ex. 7 (non-reduced) | DMF/n-butanol (90/10 by weight) | 1.0 | 80° C. × 15 minutes under reduced pressure | 30 | uniform and not peeled off | milky | ○ |
| Test Ex. 50 | Compound prepared in Ex. 8 (non-reduced) | DMF/n-butanol (90/10 by weight) | 1.0 | 80° C. × 15 minutes under reduced pressure | 15 | uniform and not peeled off | milky | ○ |
| Test Ex. 51 | Compound prepared in Ex. 9 (non-reduced | DMF/n-butanol (90/10 by weight) | 1.0 | 80° C. × 15 minutes under reduced pressure | 23 | uniform and not peeled off | milky | ○ |
| Test Ex. 52 | Compound prepared in Ex. 10 (non-reduced) | DMF/n-butanol (90/10 by weight) | 1.0 | 80° C. × 15 minutes under reduced pressure | 18 | uniform and not peeled off | milky | ○ |
| Test Ex. 53 | None* | — | — | — | 408 | — | milky | X |

(Note):
*In Test Example 53, the scale deposition preventing agent was not used.

TEST EXAMPLES 54 TO 71

The solution of quinone-amine compound shown in Table 4 was applied in the amount of 0.5 g/m² (solid matter) onto the surfaces of the inner wall of a 8 liter stainless steel polymerization vessel equipped with a stirrer and onto the surfaces of the stirring blades and the baffle plates attached within the vessel. After drying, the vessel was charged with 3000 g of demineralized water, 30 g of sodium dodecylbenzenesulfonate, 3 g of potassium persulfate, 1200 g of methyl methacrylate and 300 g of styrene, the temperature in the vessel was adjusted to 70° C., and the polymerization was carried out for eight hours. After completion of the polymerization, the obtained polymer was taken out of the vessel and the inside of the vessel was observed. The total amount of scale deposited on all the surfaces in each Test Example is shown in Table 4.

Also, the effect for preventing scale deposition is shown in Table 4. In Test Examples 59 and 60, the polymer latex was colored red, and therefore the effect was estimated at Δ.

TABLE 4

| Test Ex. No. | Solution of quinoneamine compound | | | Condition for drying | Amount* of scale (g/m²) | Condition of formed film | Color of polymer latex | Effect for preventing scale deposition |
| --- | --- | --- | --- | --- | --- | --- | --- | --- |
| | Quinoneamine compound | Organic solvent | Concentration (%) | | | | | |
| Test Ex. 54 | Compound prepared in Com. Ex. 1 (non-reduced) | DMF/n-butanol (90/10 by weight) | 1.0 | 80° C. × 15 minutes under reduced pressure | 0 | uniform and not peeled off | milky | ◎ |
| Test Ex. 55 | Compound prepared in Com. Ex. 2 (non-reduced) | DMF/n-butanol (90/10 by weight) | 1.0 | 80° C. × 15 minutes under reduced | 2 | uniform and not peeled | milky | ◎ |

TABLE 4-continued

| Test Ex. No. | Solution of quinoneamine compound | | | Condition for drying | Amount of scale (g/m²) | Condition of formed film | Color of polymer latex | Effect for preventing scale deposition |
|---|---|---|---|---|---|---|---|---|
| | Quinoneamine compound | Organic solvent | Concentration (%) | | | | | |
| Test Ex. 56 | Compound prepared in Com. Ex. 3 (non-reduced) | DMF/n-butanol (90/10 by weight) | 1.0 | 80° C. × 15 minutes under reduced pressure | 12 | uniform and not peeled off | milky | ○ |
| Test Ex. 57 | Compound prepared in Com. Ex. 4 (non-reduced) | DMF/n-butanol (90/10 by weight) | 1.0 | 80° C. × 15 minutes under reduced pressure | 3 | uniform and not peeled off | milky | ◎ |
| Test Ex. 58 | Compound prepared in Com. Ex. 5 (non-reduced) | DMF/n-butanol (90/10 by weight) | 1.0 | 80° C. × 15 minutes under reduced pressure | 0 | uniform and not peeled off | milky | ◎ |
| Test Ex. 59 | Compound prepared in Com. Ex. 6 (non-reduced) | DMF/n-butanol (90/10 by weight) | 1.0 | 80° C. × 15 minutes under reduced pressure | 15 | uniform and not peeled off | thin red | △ |
| Test Ex. 60 | Compound prepared in Com. Ex. 7 (non-reduced) | DMF/n-butanol (90/10 by weight) | 1.0 | 80° C. × 15 minutes under reduced pressure | 17 | uniform and not peeled off | thin red | △ |
| Test Ex. 61 | Compound prepared in Ex. 1 (non-reduced) | DMF/n-butanol (90/10 by weight) | 1.0 | 80° C. × 15 minutes under reduced pressure | 0 | uniform and not peeled off | milky | ◎ |
| Test Ex. 62 | Compound prepared in Ex. 2 (non-reduced) | DMF/n-butanol (90/10 by weight) | 1.0 | 80° C. × 15 minutes under reduced pressure | 0 | uniform and not peeled off | milky | ◎ |
| Test Ex. 63 | Compound prepared in Ex. 3 (non-reduced) | DMF/n-butanol (90/10 by weight) | 1.0 | 80° C. × 15 minutes under reduced pressure | 5 | uniform and not peeled off | milky | ◎ |
| Test Ex. 64 | Compound prepared in Ex. 4 (non-reduced) | DMF/n-butanol (90/10 by weight) | 1.0 | 80° C. × 15 minutes under reduced pressure | 10 | uniform and not peeled off | milky | ○ |
| Test Ex. 65 | Compound prepared in Ex. 5 (non-reduced) | DMF/n-butanol (90/10 by weight) | 1.0 | 80° C. × 15 minutes under reduced pressure | 8 | uniform and not peeled off | milky | ◎ |
| Test Ex. 66 | Compound prepared in Ex. 6 (non-reduced) | DMF/n-butanol (90/10 by weight) | 1.0 | 80° C. × 15 minutes under reduced pressure | 3 | uniform and not peeled off | milky | ◎ |
| Test Ex. 67 | Compound prepared in Ex. 7 (non-reduced) | DMF/n-butanol (90/10 by weight) | 1.0 | 80° C. × 15 minutes under reduced pressure | 5 | uniform and not peeled off | milky | ◎ |
| Test Ex. 68 | Compound prepared in Ex. 8 (non-reduced) | DMF/n-butanol (90/10 by weight) | 1.0 | 80° C. × 15 minutes under reduced pressure | 2 | uniform and not peeled off | milky | ◎ |
| Test Ex. 69 | Compound prepared in Ex. 9 (non-reduced) | DMF/n-butanol (90/10 by weight) | 1.0 | 80° C. × 15 minutes under reduced pressure | 1 | uniform and not peeled off | milky | ◎ |
| Test Ex. 70 | Compound prepared in Ex. 10 (non-reduced) | DMF/n-butanol (90/10 by weight) | 1.0 | 80° C. × 15 minutes under reduced pressure | 5 | uniform and not peeled off | milky | ◎ |
| Test Ex. 71 | None* | — | — | — | 280 | — | milky | X |

(Note):
*In Test Example 71, the scale deposition preventing agent was not used.

TEST EXAMPLES 72 TO 106

The solution of quinone-amine compound shown in Table 5 was applied in the amount of 0.5 g/m² (solid matter) onto the surfaces of the inner wall of a 3 liter stainless steel polymerization vessel and onto the surface of the stirring blades and the baffle plates attached within the vessel. After drying, the vessel was charged with 800 g of demineralized water, 20 g of potassium oleate, 2 g of potassium tertiary phosphate, 0.4 g of Rongalit, 0.02 g of disodium ethylenediaminetetraacetate, 0.012 g of ferrous sulfate, 120 g of styrene, 280 g of 1,3-butadiene and 0.4 g of p-menthanehydroperoxide. The polymerization was carried out for 15 hours at the temperature in the vessel of 30° C. with stirring. To the reaction mixture was added 800 g of demineralized water and 0.4 g of Rongalit, and then the temperature in the vessel was adjusted to 60° C. After addition of 80 g of potassium sulfate (10% aqueous solution), the polymerization was carried out for two hours by adding 120 g of methyl methacrylate containing 0.4 g of cumenehydroperoxide with 30 g thereof every 30 minutes to the reaction mixture. To the resulting reaction mixture was further added 0.8 g of cumenehydroperoxide, and then the polymerization was carried out for one hour. After completion of the polymerization, the obtained polymer was taken out of the vessel and the inside of the vessel was observed. The total amount of scale deposited on all the surfaces in each Test Example is shown in Table 5.

Also, the effect for preventing scale deposition is shown in Table 5. In Test Examples 77, 78, 84 and 85, the latex was colored red by adding methyl methacrylate, and therefor the effect was estimated at Δ.

TABLE 5

| Test Ex. No. | Solution of quinone-amine compound | | | Condition for drying | Amount of scale (g/m$^2$) | Condition of formed film | Color of polymer latex | Effect for preventing scale deposition |
| | Quinone-amine compound | Organic solvent | Concentration (%) | | | | | |
| --- | --- | --- | --- | --- | --- | --- | --- | --- |
| Test Ex. 72 | Compound prepared in Com. Ex. 1 (non-reduced) | DMAc | 1.0 | 80° C. × 15 minutes under reduced pressure | 5 | uniform and not peeled off | milky | ⊚ |
| Test Ex. 73 | Compound prepared in Com. Ex. 2 (non-reduced) | " | 0.6 | 80° C. × 15 minutes under reduced pressure | 3 | uniform and not peeled off | " | ⊚ |
| Test Ex. 74 | Compound prepared in Com. Ex. 3 (non-reduced) | " | 0.6 | 80° C. × 15 minutes under reduced pressure | 15 | uniform and not peeled off | " | ○ |
| Test Ex. 75 | Compound prepared in Com. Ex. 4 (non-reduced) | " | 1.2 | 80° C. × 15 minutes under reduced pressure | 20 | uniform and not peeled off | " | ○ |
| Test Ex. 76 | Compound prepared in Com. Ex. 5 (non-reduced) | " | 0.6 | 80° C. × 15 minutes under reduced pressure | 1 | uniform and not peeled off | " | ⊚ |
| Test Ex. 77 | Compound prepared in Com. Ex. 6 (non-reduced) | " | 1.2 | 80° C. × 15 minutes under reduced pressure | 50 | uniform and not peeled off | thin red | Δ |
| Test Ex. 78 | Compound prepared in Com. Ex. 7 (non-reduced) | " | " | 80° C. × 15 minutes under reduced pressure | 23 | uniform and not peeled off | " | Δ |
| Test Ex. 79 | Compound prepared in Com. Ex. 1 (reduced) | " | 1.0 | 80° C. × 15 minutes under reduced pressure | 0 | uniform and not peeled off | milky | ⊚ |
| Test Ex. 80 | Compound prepared in Com. Ex. 2 (reduced) | " | 0.6 | 80° C. × 15 minutes under reduced pressure | 0 | uniform and not peeled off | " | ○ |
| Test Ex. 81 | Compound prepared in Com. Ex. 3 (reduced) | " | " | 80° C. × 15 minutes under reduced pressure | 0 | uniform and not peeled off | " | ○ |
| Test Ex. 82 | Compound prepared in Com. Ex. 4 (reduced) | " | 1.2 | 80° C. × 15 minutes under reduced pressure | 8 | uniform and not peeled off | " | ○ |
| Test Ex. 83 | Compound prepared in Com. Ex. 5 (reduced) | " | 0.6 | 80° C. × 15 minutes under reduced pressure | 0 | uniform and not peeled off | " | ○ |
| Test Ex. 84 | Compound prepared in Com. Ex. 6 (reduced) | " | 1.2 | 80° C. × 15 minutes under reduced pressure | 30 | uniform and not peeled off | thin red | Δ |
| Test Ex. 85 | Compound prepared in Com. Ex. 7 (reduced) | " | " | 80° C. × 15 minutes under reduced pressure | 28 | uniform and not peeled off | " | Δ |
| Test Ex. 86 | Compound prepared in Ex. 1 (non-reduced) | " | 1.0 | 80° C. × 15 minutes under reduced pressure | 0 | uniform and not peeled off | milky | ⊚ |
| Test Ex. 87 | Compound prepared in Ex. 2 (non-reduced) | " | " | 80° C. × 15 minutes under reduced pressure | 3 | uniform and not peeled off | " | ⊚ |
| Test Ex. 88 | Compound prepared in Ex. 3 (non-reduced) | " | " | 80° C. × 15 minutes under reduced pressure | 0 | uniform and not peeled off | " | ○ |
| Test | Compound prepared | " | " | 80° C. × | 10 | uniform | " | ○ |

TABLE 5-continued

| Test Ex. No. | Solution of quinone-amine compound | | | Condition for drying | Amount of scale (g/m²) | Condition of formed film | Color of polymer latex | Effect for preventing scale deposition |
|---|---|---|---|---|---|---|---|---|
| | Quinone-amine compound | Organic solvent | Concentration (%) | | | | | |
| Ex. 89 | in Ex. 4 (non-reduced) | | | 15 minutes under reduced pressure | | and not peeled off | | ○ |
| Test Ex. 90 | Compound prepared in Ex. 5 (non-reduced) | " | " | 80° C. × 15 minutes under reduced pressure | 11 | uniform and not peeled off | " | ◎ |
| Test Ex. 91 | Compound prepared in Ex. 6 (non-reduced) | " | " | 80° C. × 15 minutes under reduced pressure | 9 | uniform and not peeled off | " | ○ |
| Test Ex. 92 | Compound prepared in Ex. 7 (non-reduced) | " | " | 80° C. × 15 minutes under reduced pressure | 20 | uniform and not peeled off | " | ○ |
| Test Ex. 93 | Compound prepared in Ex. 8 (non-reduced) | " | " | 80° C. × 15 minutes under reduced pressure | 0 | uniform and not peeled off | " | ○ |
| Test Ex. 94 | Compound prepared in Ex. 9 (non-reduced) | " | " | 80° C. × 15 minutes under reduced pressure | 0 | uniform and not peeled off | " | ○ |
| Test Ex. 95 | Compound prepared in Ex. 10 (non-reduced) | " | " | 80° C. × 15 minutes under reduced pressure | 5 | uniform and not peeled off | " | ○ |
| Test Ex. 96 | Compound prepared in Ex. 1 (reduced) | " | " | 80° C. × 15 minutes under reduced pressure | 0 | uniform and not peeled off | " | ○ |
| Test Ex. 97 | Compound prepared in Ex. 2 (reduced) | " | " | 80° C. × 15 minutes under reduced pressure | 0 | uniform and not peeled off | " | ○ |
| Test Ex. 98 | Compound prepared in Ex. 3 (reduced) | " | " | 80° C. × 15 minutes under reduced pressure | 0 | uniform and not peeled off | " | ○ |
| Test Ex. 99 | Compound prepared in Ex. 4 (reduced) | " | " | 80° C. × 15 minutes under reduced pressure | 10 | uniform and not peeled off | " | ○ |
| Test Ex. 100 | Compound prepared in Ex. 5 (reduced) | " | " | 80° C. × 15 minutes under reduced pressure | 8 | uniform and not peeled off | " | ○ |
| Test Ex. 101 | Compound prepared in Ex. 6 (reduced) | " | " | 80° C. × 15 minutes under reduced pressure | 0 | uniform and not peeled off | " | ○ |
| Test Ex. 102 | Compound prepared in Ex. 7 (reduced) | " | " | 80° C. × 15 minutes under reduced pressure | 5 | uniform and not peeled off | " | ○ |
| Test Ex. 103 | Compound prepared in Ex. 8 (reduced) | " | " | 80° C. × 15 minutes under reduced pressure | 3 | uniform and not peeled off | " | ○ |
| Test Ex. 104 | Compound prepared in Ex. 9 (reduced) | " | " | 80° C. × 15 minutes under reduced pressure | 2 | uniform and not peeled off | " | ○ |
| Test Ex. 105 | Compound prepared in Ex. 10 (reduced) | " | " | 80° C. × 15 minutes under reduced pressure | 0 | uniform and not peeled off | " | ○ |
| Test Ex. 106 | None | — | — | — | 298 | — | " | X |

(Note):
*In Test Example 106, the scale deposition preventing agent was not used.

TEST EXAMPLES 107 TO 123

The solution of quinoe-amine shown in Table 6 was applied in the amount of 0.5 g/m² (solid matter) onto the surfaces of the inner wall of a 15 liter stainless steel polymerization vessel and onto the surfaces of the stirring blades and the baffle plates attached within the vessel, and the vessel was dried.

The vessel was charged with 7000 g of demineralized water, 70 g of sodium dodecylbenzenesulfonate, 7 g of potassium persulfate, 2800 g of methyl methacrylate and 700 g of styrene. The polymerization was carried out at an inner temperature of 70° C. for eight hours. After completion of the polymerization, the obtained polymer was taken out of the vessel and the inside of the vessel was washed with water.

The same polymerization procedure as above was repeated in the same vessel used in the above polymerization until the total amount of a scale deposited on all surfaces within the vessel was over 10 g/m$^2$. The number of polymerizations was shown in Table 6 as the number of preventing scale deposition.

TABLE 6

| Test Ex. No. | Solution of quinone-amine compound | | | Condition for drying | Condition of formed film | Color of polymer latex | Number of preventing scale deposition |
|---|---|---|---|---|---|---|---|
| | Quinone-amine compound | Organic solvent | Concentration (%) | | | | |
| Test Ex. 107 | Compound prepared in Com. Ex. 1 (reduced) | DMF/n-butanol (90/10 by weight) | 1.0 | 80° C. × 15 minutes under reduced pressure | uniform and not peeled off | milky | 15 |
| Test Ex. 108 | Compound prepared in Com. Ex. 2 (reduced) | DMF/n-butanol (90/10 by weight) | 1.0 | 80° C. × 15 minutes under reduced pressure | uniform and not peeled off | milky | 14 |
| Test Ex. 109 | Compound prepared in Com. Ex. 3 (reduced) | DMF/n-butanol (90/10 by weight) | 1.0 | 80° C. × 15 minutes under reduced pressure | uniform and not peeled off | milky | 7 |
| Test Ex. 110 | Compound prepared in Com. Ex. 4 (reduced) | DMF/n-butanol (90/10 by weight) | 1.0 | 80° C. × 15 minutes under reduced pressure | uniform and not peeled off | milky | 21 |
| Test Ex. 111 | Compound prepared in Com. Ex. 5 (reduced) | DMF/n-butanol (90/10 by weight) | 1.0 | 80° C. × 15 minutes under reduced pressure | uniform and not peeled off | milky | 13 |
| Test Ex. 112 | Compound prepared in Com. Ex. 6 (reduced) | DMF/n-butanol (90/10 by weight) | 1.0 | 80° C. × 15 minutes under reduced pressure | uniform and not peeled off | thin red | 1 |
| Test Ex. 113 | Compound prepared in Com. Ex. 7 (reduced) | DMF/n-butanol (90/10 by weight) | 1.0 | 80° C. × 15 minutes under reduced pressure | uniform and not peeled off | thin red | 1 |
| Test Ex. 114 | Compound prepared in Ex. 1 (reduced) | DMF/n-butanol (90/10 by weight) | 1.0 | 80° C. × 15 minutes under reduced pressure | uniform and not peeled off | milky | 63 |
| Test Ex. 115 | Compound prepared in Ex. 2 (reduced) | DMF/n-butanol (90/10 by weight) | 1.0 | 80° C. × 15 minutes under reduced pressure | uniform and not peeled off | milky | 52 |
| Test Ex. 116 | Compound prepared in Ex. 3 (reduced) | DMF/n-butanol (90/10 by weight) | 1.0 | 80° C. × 15 minutes under reduced pressure | uniform and not peeled off | milky | 38 |
| Test Ex. 117 | Compound prepared in Ex. 4 (reduced) | DMF/n-butanol (90/10 by weight) | 1.0 | 80° C. × 15 minutes under reduced pressure | uniform and not peeled off | milky | 25 |
| Test Ex. 118 | Compound prepared in Ex. 5 (reduced) | DMF/n-butanol (90/10 by weight) | 1.0 | 80° C. × 15 minutes under reduced pressure | uniform and not peeled off | milky | 18 |
| Test Ex. 119 | Compound prepared in Ex. 6 (reduced) | DMF/n-butanol (90/10 by weight) | 1.0 | 80° C. × 15 minutes under reduced pressure | uniform and not peeled off | milky | 48 |
| Test Ex. 120 | Compound prepared in Ex. 7 (reduced) | DMF/n-butanol (90/10 by weight) | 1.0 | 80° C. × 15 minutes under reduced pressure | uniform and not peeled off | milky | 29 |
| Test Ex. 121 | Compound prepared in Ex. 8 (reduced) | DMF/n-butanol (90/10 by weight) | 1.0 | 80° C. × 15 minutes under reduced pressure | uniform and not peeled off | milky | 36 |
| Test Ex. 122 | Compound prepared in Ex. 9 (reduced) | DMF/n-butanol (90/10 by weight) | 1.0 | 80° C. × 15 minutes under reduced pressure | uniform and not peeled off | milky | 25 |
| Test Ex. 123 | Compound prepared in Ex. 10 (reduced) | DMF/n-butanol (90/10 by weight) | 1.0 | 80° C. × 15 minutes under reduced pressure | uniform and not peeled off | milky | 18 |

TABLE 6-continued

| Test Ex. No. | Solution of quinone-amine compound | | Concentration (%) | Condition for drying | Condition of formed film | Color of polymer latex | Number of preventing scale deposition |
|---|---|---|---|---|---|---|---|
| | Quinone-amine compound | Organic solvent | | pressure | | | |

What we claim is:

1. A process for preparing a scale deposition preventing agent of a quinone-amine compound suitable for use in a polymerization of acrylic or methacrylic acid ester monomers, which comprises (A) subjecting an aromatic quinone and an aromatic diamine to addition reaction in a solvent having a solubility parameter of 8.5 to 24.0 to give an addition product, and (B) subjecting to a reaction for converting the addition product into a high molecular weight compound within 24 hours after beginning the addition reaction (A) by subjecting the addition reaction mixture to oxidation reaction to give a quinone-amine compound.

2. The process of claim 1, wherein said quinone-amine compound has an average molecular weight of not less than 3,000.

3. The process of claim 1, wherein said quinone-amine compound has a molecular weight of not less than 8,000.

4. The process of claim 1, wherein said aromatic diamine has naphthalene ring.

5. The process of claim 1, wherein said aromatic quinone has benzene ring, naphthalene ring or phenanthrene ring.

6. The process of claim 1, wherein said solvent has a dielectric conductivity of not less than 7.

7. The process of claim 1, wherein said solvent is at least one member selected from the group consisting of tetrahydrofuran, dimethylformamide, dimethylacetamide, acetonitrile, acetone, methyl ethyl ketone, diethyl ketone, methyl isobutyl ketone, methyl n-butyl ketone, methyl n-propyl ketone, dioxane, methanol, ethanol, acetic acid, pyridine, toluene, benzene, xylene, propanol, chlorobenzene, chloroform, ethyl acetate, n-butyl alcohol, dimethyl sulfoxide and water.

8. The process of claim 1, wherein said oxidation reaction is carried out by adding an oxidizing agent to the addition reaction mixture.

9. The process of claim 1, wherein said oxidation reaction is carried out by subjecting the addition reaction mixture to anodic oxidation with an electrode.

10. The process of claim 9, wherein an amount of said oxidizing agent is from 0.0001 to 5,000 parts by weight per part by weight of the total amount of starting materials used in said addition reaction (A).

11. The process of claim 9, wherein an amount of said oxidizing agent is from 0.1 to 500 parts by weight per part by weight of the total amount of starting materials used in said addition reaction (A).

12. The process of claim 9, wherein an amount of said oxidizing agent is from 1 to 50 parts by weight per part by weight of the total amount of starting materials used in said addition reaction (A).

13. The process of claim 9, wherein said oxidizing agent is a member selected from the group consisting of chromic acid, lead tetraacetate, lead dioxide, mercury (II) oxide, a halogen, a halogen acid, oxygen, hydrogen peroxide, an organic peroxide, nitric acid, dinitrogen tetroxide, 2,3-dichloro-5,6-dicyano-1,4-benzoquinone, o-chloranil, chloranil, silver (I) oxide, silver (I) carbonate, an ferric salt, a thalium (III) salt, ammonium cerium (IV) oxalate, nickel peroxide, chloro-gold (III) acid, manganese dioxide, periodic acid, N-halocarboxylic acid amide, hypohalogenous acid ester, iodosyl compound, cupric chloride, cupric sulfate and peroxoborate.

14. The process of claim 13, wherein said ferric salt is ferric chloride.

15. The process of claim 13, wherein said oxidizing agent is cupric chloride.

16. The process of claim 1, wherein said quinone-amine compound is reduced.

* * * * *